(12) United States Patent
Oakes, III et al.

(10) Patent No.: US 11,912,073 B1
(45) Date of Patent: *Feb. 27, 2024

(54) SYSTEM AND METHOD FOR DETERMINING TIRE WEAR AND DEFECTS

(71) Applicants: Charles Lee Oakes, III, Boerne, TX (US); Jess W. Gingrich, San Antonio, TX (US)

(72) Inventors: Charles Lee Oakes, III, Boerne, TX (US); Jess W. Gingrich, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/823,006

(22) Filed: Aug. 29, 2022

Related U.S. Application Data

(63) Continuation of application No. 16/865,720, filed on May 4, 2020, now Pat. No. 11,440,358, which is a (Continued)

(51) Int. Cl.
*B60C 23/04* (2006.01)
*B60C 11/24* (2006.01)

(52) U.S. Cl.
CPC ........ *B60C 23/0477* (2013.01); *B60C 11/243* (2013.01); *B60C 23/0476* (2013.01); *B60C 23/0486* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/20; B60C 23/0444; B60C 23/0462; B60C 11/24; B60C 23/064; B60C 23/007; B60C 23/0479; B60C 23/062; B60C 23/003; B60C 23/0401; B60C 23/0413; B60C 23/0488; B60C 23/0498; B60C 23/043; B60C 23/06; B60C 23/0452; B60C 23/0467; B60C 11/246; B60C 23/02; B60C 99/006; B60C 23/0428; B60C 23/0442; B60C 23/009; B60C 23/0425; B60C 2019/004; B60C 23/004; B60C 11/243; B60C 23/045; B60C 23/0464; B60C 23/0472; B60C 23/066; B60C 23/0403; B60C 23/0406; B60C 29/02; B60C 11/00; B60C 23/006;

(Continued)

(56) References Cited

U.S. PATENT DOCUMENTS

2006/0244581 A1  11/2006  Breed et al.
2007/0156312 A1  7/2007   Breed et al.

(Continued)

OTHER PUBLICATIONS

Pay Less at the Gas Pump This Summer by Kevin O'Reilly, CFP® on Apr. 30, 2013 in Spending (Year: 2013).

*Primary Examiner* — Andre J Allen
(74) *Attorney, Agent, or Firm* — BakerHostetler

(57) ABSTRACT

The present invention provides a tire-wear detection sensor for a vehicle having a telematics system and tires including a temperature sensor, a pressure sensor, and an RF antenna in electronic communication with the sensors, and capable of transmitting the temperature signal and the pressure signal to the telematics system.

18 Claims, 2 Drawing Sheets

Related U.S. Application Data continuation of application No. 15/703,540, filed on Sep. 13, 2017, now Pat. No. 10,675,925.

(60) Provisional application No. 62/394,497, filed on Sep. 14, 2016.

(58) Field of Classification Search
CPC ... B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/0483; B60C 11/0318; B60C 23/0459; B60C 23/0471; B60C 23/0481; B60C 23/042; B60C 23/12; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/0484; B60C 23/0486; B60C 23/08; B60C 17/00; B60C 2019/006; B60C 23/001; B60C 25/142; B60C 17/02; B60C 23/0445; B60C 5/004; B60C 11/0083; B60C 25/145; B60C 29/00; B60C 9/02; B60C 11/0332; B60C 23/0418; B60C 23/0457; B60C 25/18; B60C 11/13; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/04985; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/067; B60C 23/18; B60C 25/02; B60C 7/12; B60C 11/02; B60C 17/0009; B60C 19/002; B60C 19/08; B60C 19/12; B60C 2019/007; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; G01L 17/00; G01L 17/005; G01L 5/20; G01L 19/086; G01L 5/161; G01L 5/1627; G01L 19/12; G01L 9/0075; G01L 19/083; G01L 7/16; G01L 19/0092; G01L 19/08; G01L 5/0019; G01L 7/166; G01L 9/0025; G01L 5/164; G01L 9/0072; G01L 9/125; G01L 19/0636; G01L 5/162; G01L 27/007; G01L 19/0007; G01L 5/0004; G01L 5/16; G01L 25/00; G01L 1/146; G01L 1/16; G01L 27/005; G01L 5/282; G01L 7/04; G01L 9/0073; G01L 19/04; G01L 5/28; G01L 9/0089; G01L 9/12; G01L 1/18; G01L 19/0618; G01L 19/10; G01L 19/16; G01L 5/169; G01L 1/122; G01L 1/2206; G01L 13/00; G01L 19/02; G01L 5/167; G01L 1/22; G01L 1/2287; G01L 3/245; G01L 5/0023; G01L 5/102; G01L 9/0008; G01L 9/0055; G01L 9/04; G01L 1/20; G01L 15/00; G01L 19/141; G01L 19/147; G01L 27/00; G01L 27/02; G01L 3/14; G01L 5/00; G01L 5/0009; G01L 5/045; G01L 5/223; G01L 7/086; G01L 7/163; G01L 9/0041; G01L 9/0047; G01L 1/142; G01L 1/165; G01L 1/2218; G01L 1/2262; G01L 1/2268; G01L 1/2281; G01L 11/00; G01L 19/0015; G01L 19/0084; G01L 19/0609; G01L 19/0627; G01L 19/0645; G01L 19/0672; G01L 19/069; G01L 19/14; G01L 19/148; G01L 3/1464; G01L 3/22; G01L 5/108; G01L 5/12; G01L 5/13; G01L 5/133; G01L 5/26; G01L 5/284; G01L 7/022;

G01L 7/043; G01L 7/084; G01L 7/088;
G01L 7/187; G01L 9/0051; G01L 9/008;
G01L 9/06; G01L 9/065; G01L 9/08;
G01L 9/14; G01L 19/0038; G01L 19/06;
G01L 19/0654; G01L 19/142; G01L
19/145; G01L 2019/0053; G01L 3/108;
G01L 5/0085; G01L 5/166; G01L 7/02;
G01L 9/0052; G01L 9/0098; G01L 9/10
USPC ................................................ 73/146–146.8
See application file for complete search history.

(56)  References Cited

U.S. PATENT DOCUMENTS

2008/0216567 A1   9/2008   Breed
2010/0207754 A1   8/2010   Shostak et al.

SYSTEM AND METHOD FOR DETERMINING TIRE WEAR AND DEFECTS

CROSS-REFERENCE TO RELATED APPLICATIONS

The present application is a continuation of U.S. patent Ser. No. 16/865,720 filed May 4, 2020, which is a continuation of U.S. patent application Ser. No. 15/703,540 filed Sep. 13, 2017, which issued Jun. 9, 2020, as U.S. Pat. No. 10,675,925, which claims the benefit of U.S. Provisional Patent Application No. 62/394,497 filed Sep. 14, 2016, the contents of which are incorporated herein in their entirety by reference and made a part hereof.

FIELD OF THE INVENTION

The present invention provides a system for determining an amount of wear on a tire and irregular tire shapes of a vehicle and more particularly a system for determining and reporting in real time such conditions to an occupant of the vehicle.

DESCRIPTION OF THE PRIOR ART

Telematics systems for vehicles integrate electrical communication with a variety of sensors located in positions throughout the vehicle and external thereto. Selected data from these sensors can be displayed on a dashboard or other display for review by a driver or other occupant of the vehicle. Safe operation of a vehicle depends in part on proper maintenance of tire pressure in each tire. This need led to the development of telematics systems to measure and report the tire pressure of each tire of a vehicle. One such system uses a tire pressure gauge incorporated into a fill stem of a tire valve and positioned outside the tire. The pressure sensor generates a signal representative of the pressure inside the tire and wirelessly communicates it to the vehicle telematics system. These data are available for display on the dashboard or other display in the vehicle. Notwithstanding this advance in vehicle telematics, cars and trucks with rubber tires still have tire blow outs, layer separation, flats and accidents due to such tire failures.

Due to the high number of vehicular incidents resulting from tire failure, it is warranted to improve tire safety through use of detection methodologies to determine factors like tire wear, tire useful life remaining; irregular shapes in the tread and the sidewalls such as bulges, bubbles, indentations, tire layer separation; and other irregularities or abnormalities. Sensors improve the detection of tire irregularities that can be easily missed by a visual inspection of a tire. By measuring other physical characteristics of the tire with additional sensors, other tire abnormalities can be detected that would otherwise be missed by using tire pressure sensors alone.

The present invention provides a system of sensors, electronic communication components, and related software for communicating with a telematics system of a vehicle, for reporting on the extent of tire wear or other defects to occupants of the vehicle in real time. It is possible this information can reduce the number of vehicle accidents that occur every year due to tire wear and unsafe tire conditions.

SUMMARY OF THE INVENTION

The present invention provides a tire-wear detection sensor for a vehicle having a telematics system and tires including a temperature sensor, a pressure sensor, and an RF antenna in electronic communication with the sensors, and capable of transmitting the temperature signal and the pressure signal to the telematics system.

The present invention also provides a tire-wear detection system for a vehicle having a telematics system and tires including a tire having an interior surface with a temperature sensor and a pressure sensor attached thereto, a controller, and an RF antenna in wireless communication with the temperature sensor, the pressure sensor and the controller and capable of receiving a temperature signal, a pressure signal and other controller signals and transmits any and all of these signals to the telematics system.

BRIEF DESCRIPTION OF THE DRAWINGS

To understand the present invention, it will now be described by way of example, with reference to the accompanying drawings and attachments in which.

DETAILED DESCRIPTION

Figure 1:
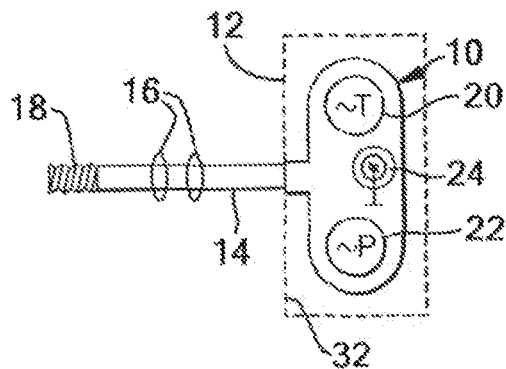
FIG. 1 is a schematic diagram of a valve stem of a car and an associated set of temperature and pressure sensors and an RF transmitting antenna.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
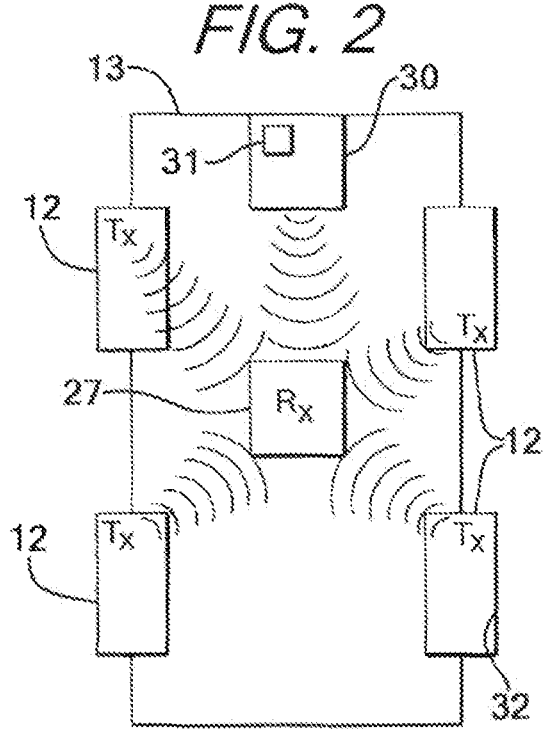
FIG. 2 is a schematic view of an underside of a vehicle utilizing the sensors and antenna of FIG. 1 with each of four wheels of a vehicle.

FIGS. 1 and 2 show an array of sensors 10 mounted inside a tire 12 of a vehicle 13, having a valve stem 14, a rim seal 16 and a fill nipple 18. The sensor array 10 has, for example, a temperature sensor 20, a pressure sensor 22 and an RF transmitting antenna 24 in electronic communication with an RF receiving antenna 27 which is in turn in electronic communication with a telematics system 30 of the vehicle 13. A controller 31 is provided for calculating tire wear and other abnormalities and is either part of the telematics system 30 or is in electronic communication therewith. The controller 31 has a processor, a memory, and computer readable instructions in the memory that when run by the processor calculates tire wear or other tire abnormality and reports this information to the telematics system 30 for display to occupants of the vehicle.

Other sensors can be utilized alone or in combination with the temperature and pressures sensors and can include a moisture sensor, a motion sensor to count the rotation of the tire, an ammeter or other sensor well known to one or ordinary skill in the art. In a preferred form of the invention, the sensor array is located inside the tire 12 and attached to an inside wall 32 of the tire. An RF receiving antenna can be located outside the tire and attached to the vehicle as shown in FIG. 2 and be in electronic communication with the RF transmitting antenna 24 and preferably wirelessly connected thereto. In a preferred form of the invention, each tire of a vehicle will have a sensor array 10 inside the tire. While the vehicle shown in FIG. 2 has four tires, it is contemplated the vehicle can have at least one tire and as many as necessary to function for its intended purpose.

Telematics systems include numerous functions for emergency situations, services for the convenience of the users of the vehicle, and maintenance reminders and alerts. Emergency services include automatic vehicle-collision notification, an emergency call button to contact a security service, lane departure warning, vehicle tracking, inter-vehicle warning and safety links to share warnings or alerts with vehicles in the vicinity of a host vehicle, weather alerts, fasten seat belt alert, and collision warning to name a few. Convenience services include a remote engine start, remote door unlock, navigation and mapping, turn-by-turn instructions, hands-free cell phone, text to speech services, lights-on warning, keys in the ignition warning, keys in the car warning, and smart phone apps link. Maintenance services include maintenance alerts and reminders, displays for oil temperature, oil pressure, tire pressure, water temperature, tachometer, odometer, vehicle speed, and vehicle heading direction.

FIGS. 3-9 show methods for detecting, calculating, and reporting tire wear, and irregular tire shape. Tire wear can be reported as a percentage of useful life left in the tire, and as the tire approaches the end of its useful life alerts can be generated for display to occupants of the vehicle to replace the tire. A tire can take on an abnormal or irregular shapes or conditions that can result in less than optimal performance, or more seriously, and unsafe driving condition of the vehicle. The irregularity can be present in the sidewall, tread or both. Irregular shapes and conditions include tire ballooning, protrusions, bumps, bubbles, indentations, uneven inflation, tire layer separation, crazing and cracking in the tire, foreign objects in the tire, overinflated condition, underinflated condition, overloaded, and other defects well known to those of skill in the art.

Figure 3:
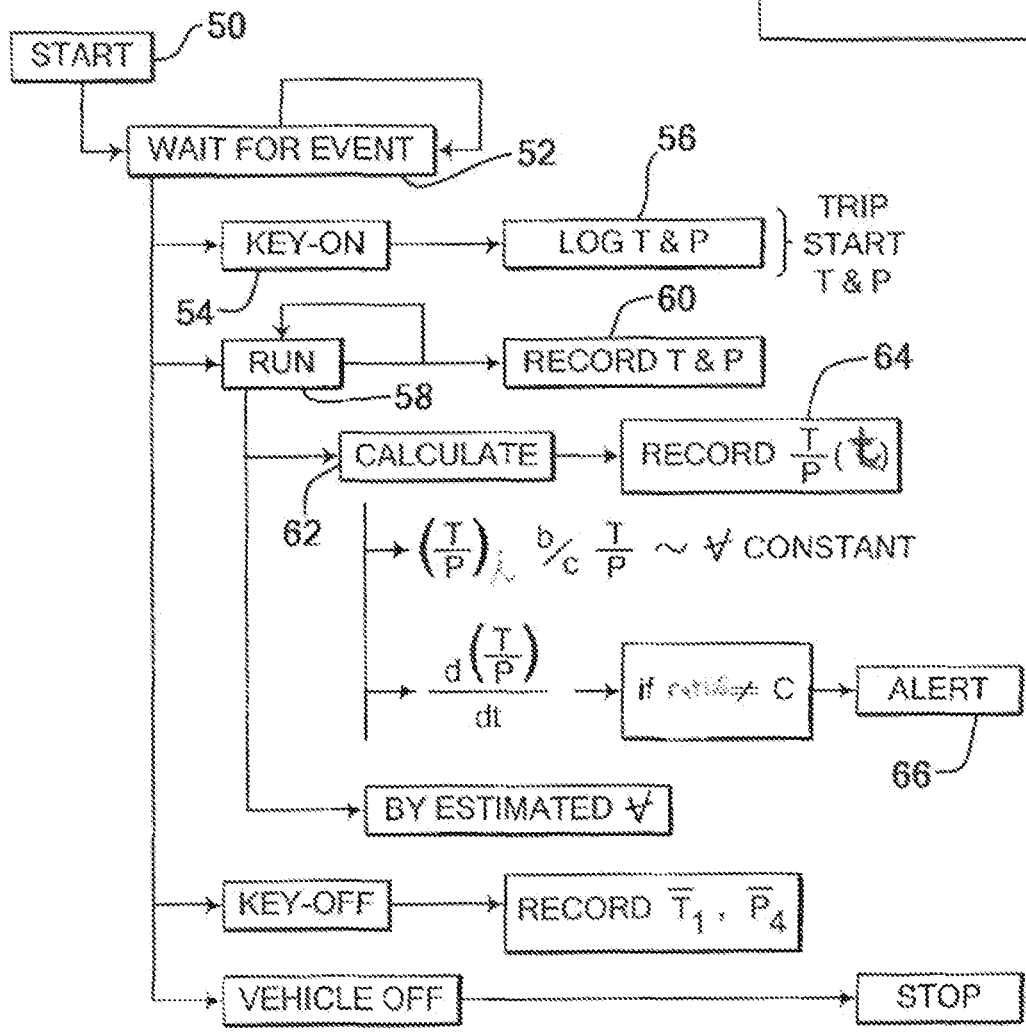
FIG. 3 is a flow chart of one method of detecting tire wear and alerting of certain conditions by detecting changes in the ratio of temperature and pressure in the tire at various points during a trip.

FIG. 3 shows a flowchart for detecting whether a tire has had a change in volume over a period of time which may indicate a defect. The method requires using a temperature sensor in conjunction with a pressure sensor. The controller 31 has computer readable instructions in the memory that when run by the processor periodically records the temperature and pressure values and calculates the ratio of the temperature to the pressure and compares current ratios with past ratios to identify differences that may indicate a tire defect. The process starts at block 50 where the processor waits for an event to occur 52 such as a key-on event where the vehicle's engine or electric motor is started and the temperature and pressure readings are initially recorded 56. During the trip 58 the temperature and pressure values are taken periodically and recorded 60. Using the controller 31, the ratio of temperature to pressure is calculated 62 and recorded 64 periodically over a period (t). Current temperature and pressure ratios are compared with those taken at key-on 54. If the differences in the ratios reach a predetermined set point an alert 66 is given to the occupants of the vehicle that the tire may need inspection, repair or replacement. The alerts can be of varying degrees of urgency from a simple reminder of a scheduled maintenance to a warning against driving the vehicle.

Figure 4:
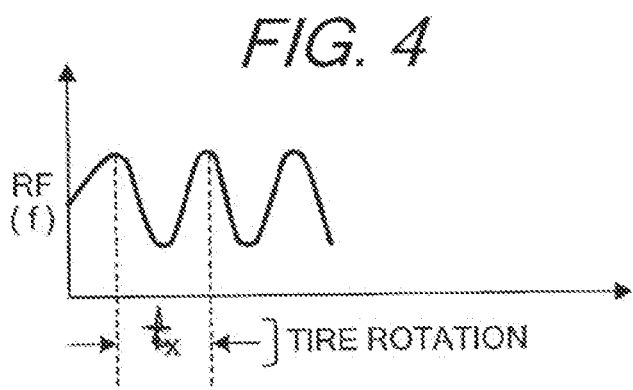
FIG. 4 is a chart useful in a second method and a third method for detecting tire wear and alerting of certain conditions; the second method requires measuring an RF transmission through the tire and recording such measurements over time to estimate tire wear and to detect and alert of certain conditions; and, the third method of measuring the ratio of the number of tire rotations per the distance traveled and by measuring the change in this ratio over time to estimate tire wear and to detect and alert of certain conditions.
Figure 5:
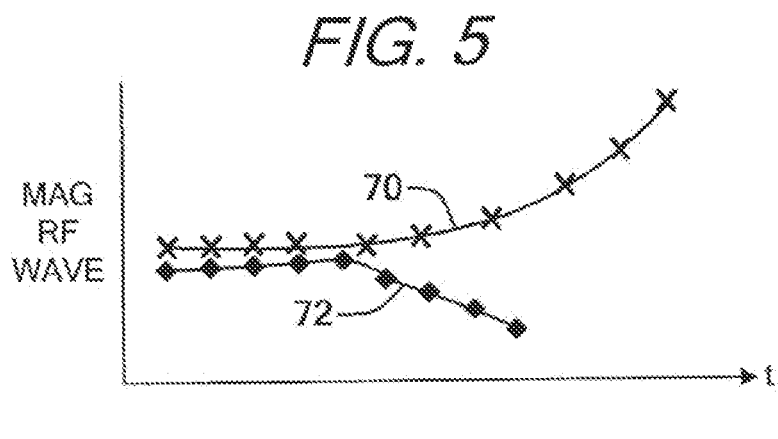
FIG. 5 is a chart of the magnitude of an RF wave on the y-axis versus time on the x-axis showing one condition of tire wear and a second condition indicating tire layer separation.

FIGS. 4 and 5 show a second and a third method for detecting volume or size changes in the tire. The second method requires the use of a radio frequency (RF) transmitter and an RF receiver mounted on opposite sides of the tire and the amplitude of the RF signal is plotted over time. The newer the tire the greater the amount of material the RF signal must pass through and the greater the attenuation of the signal and the lower the amplitude of the RF signal. As the tire decreases in size due to wear, the amplitude of the RF signal increases over time and the change in amplitude can be correlated with the degree of tire wear. The useable life remaining in the tire can be estimated and reported to the occupants of the vehicle. The third method 99 (FIG. 4) records the number of tire rotations during a period of time and the distance traveled during this period and the controller 31 calculates a ratio of rotations/distance. Changes in this ratio plotted over time is an indicator of tire wear because as the tires wear and lose radial dimension over use, a greater number of rotations of the tire is required to go the same distance when compared to the ratio when the tire was new. The change in the ratio values can be correlated to tire wear extent. Again, threshold values can be set of when to alert and warn the occupants of a worn out tire.

The controller can also compare sensor readings and calculated ratios from one tire of the vehicle with another tire or tires of the vehicle. If it is found that one tire is wearing faster than the other tires an alert or warning can be generated that the vehicle is out of alignment or has other issues that should be addressed.

FIG. 5 shows a plot of amplitude over time and in a first condition 70 shown in "x" marked data points, the RF signal amplitude increases over time at a certain point to indicate tire wear. A second set of values 72 plotted in diamond shaped marks shows a decrease over time in the amplitude of the RF signal to indicate tire layer separation. A set of threshold values can be established and used by the controller 31 to determine the amount of wear in the tires and the degree of layer separation and the appropriate alert or warning to send to the occupants.

Figure 8:
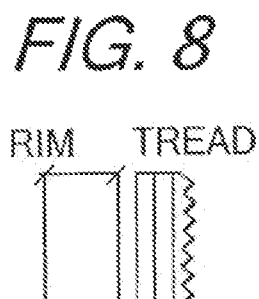
FIG. 8 is a schematic view in side elevation of a tire having normal tread and has the RF wave transmission signature of FIG. 6.
Figure 9:
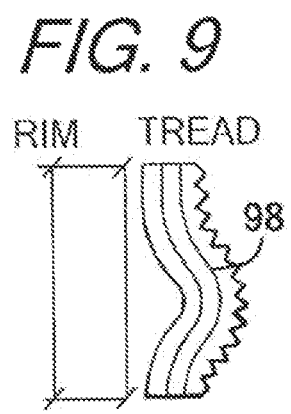
FIG. 9 is a schematic view in side elevation of a bulging tire in the process of tire layer separation and has the RF wave transmission signature of FIG. 7.
Figure 6:
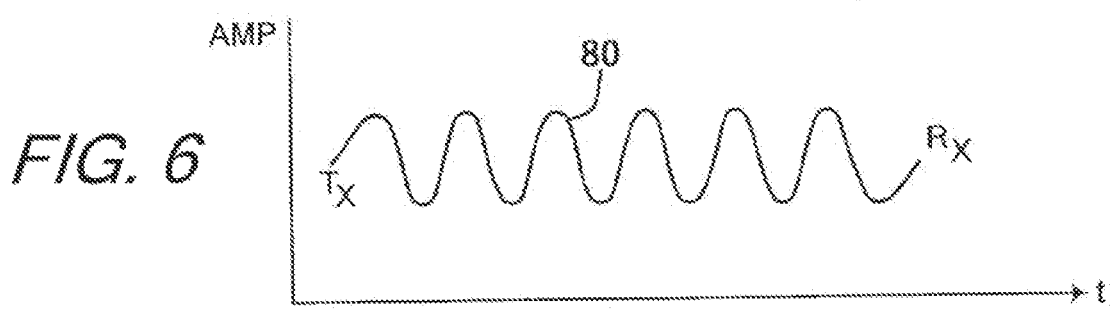
FIG. 6 is a chart of the magnitude of an RF wave on the y-axis versus time on the x-axis showing normal tire wear as indicated by a constant magnitude.
Figure 7:
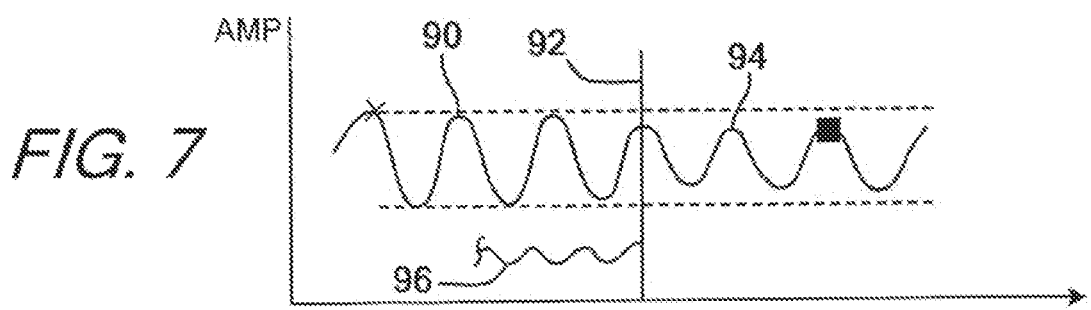
FIG. 7 is a chart of the magnitude of an RF wave on the y-axis versus time on the x-axis showing abnormal tire wear, in this case, tire separation as indicated by a reduction in the amplitude of the RF wave.

FIGS. 6 and 8 show an RF signal amplitude plotted 80 over time for a tire in normal condition. The amplitude remains constant over the time period measured. FIGS. 7 and 9 show an RF signal amplitude plotted over time and the amplitude 90 is constant for a period of time and then transitions at time 92 into reduced amplitude portion 94 of the plot. The reduced amplitude is believed to be due to a reflection 96 caused by an increased thickness in a portion 98 of the sidewall due to tire layer separation. Threshold values can be used to determine whether to send an alert or a warning to the occupants.

Other methodologies and sensors can be used to detect tire wear and abnormalities. One such system relies on generating a current in a loop of wire inside a tire. The wire loop extends about the circumference of the tire, and an ammeter is connected to the wire loop to measure an electrical current in the wire. A magnetic field generator is attached to the vehicle in a position proximate a tire for creating a magnetic field through the wire as the tire rotates. The magnetic field is turned off and a secondary current is measured in the wire loop. Changes in the current readings over time indicate a change in the tire size or shape. A suitable wire loop can be a wire within the sidewall of the tire and can be of a material including a metal, metal alloy, and most preferably a steel belt in the tire.

Another methodology involves measuring the moisture content of the tire and comparing moisture content changes over time. The loss in moisture can be correlated with tire wear. Yet another methodology involves using a microphone to record a sound signature of the tire and determining changes in the sound signature of the tire over time. Changes in the tire sound signature can indicate tire wear and other abnormalities.

The present invention can include a combination of the tire wear and tire defect techniques set forth above. One method includes the steps of: (1) providing a temperature sensor on an interior surface of a tire; (2) providing a pressure sensor on the interior surface of the tire; (3) providing a radio frequency antenna inside the tire; (4) calculating a ratio of a temperature and a pressure of the interior of the tire at a first point in time to determine a first ratio; (5) calculating a ratio of a temperature and a pressure of the interior of the tire at a second point in time later than the first point in time to determine a second ratio; (6) calculating a difference between the first ratio and the second ratio; (7) comparing the difference with a threshold value; and (8) transmitting a signal to the telematics system of a tire wear if the difference exceeds the threshold value.

The method can also include the steps of: (1) measuring the number of tire rotations over a period of time; (2) measuring the distance traveled over the period of time; (3) calculating a first ratio of the distance traveled per tire rotation at a first period of time; (4) calculating a second ratio of the distance traveled per tire rotation at a second period of time; (5) calculating a difference between the first ratio and the second ratio; (6) comparing the difference with a threshold value; and (7) transmitting a signal to the telematics system of tire wear if the difference exceeds the threshold value.

The method can also include the steps of: (1) measuring a first radio frequency attenuation value through the tire at a first point in time; (2) measuring a second radio frequency attenuation value through the tire at a second point in time later than the first point in time; (3) calculating a difference between the first value and the second value; (4) comparing the difference with a threshold value; and (5) transmitting a signal to the telematics system of irregular tire shape if the difference exceeds the threshold value.

The method can also include the steps of: (1) measuring a first moisture content of the tire at a first point in time; (2) measuring a second moisture content of the tire at a second point in time; (3) calculating a difference between the first value and the second value; (4) comparing the difference with a threshold value; and (5) transmitting a signal to the telematics system if the difference exceeds the threshold value.

A "vehicle" is meant to include a means of conveyance of human occupants that have rubber tires as ground engaging means to move the vehicle from one location to another and includes motorized and non-motorized vehicles. Suitable vehicles include a unicycle, bicycle, motorcycle, car, van, truck and others well known to those of ordinary skill in the art.

Many modifications and variations of the present invention are possible in light of the above teachings. It is, therefore, to be understood within the scope of the appended claims the invention may be protected otherwise than as specifically described.

We claim:

1. A tire-wear detection system for a vehicle having a telematics system and tires comprising:
    a tire having a circumference and a wire loop extending about the circumference; and
    an ammeter connected to the wire loop, wherein the ammeter measures an electrical current value in the wire, wherein the tire wear detection system determines a warning of a tire defect when a difference in a first current value measured at a first point in time and a second current value measured at a second point in time exceeds a threshold current difference value.

2. The tire-wear detection system of claim 1 further comprising a radio frequency (RF) antenna wirelessly connected to the telematics system.

3. The tire-wear detection system of claim 1 wherein measuring the first current value and the second current value comprises turning off a magnetic field generator and measuring, by the ammeter, a secondary current generated in the wire loop.

4. The tire-wear detection system of claim 3 wherein the wire loop is a metal, a metal alloy, or a steel belt running through the tire.

5. The tire-wear detection system of claim 1 further comprising a microphone mounted proximate the tire, wherein the microphone records a sound signature of the tire, the microphone generates a signal representative of the sound signature, the microphone transmits the sound signature signal to the controller, the sound signature of the tire is recorded over time, and a most recent sound signature signal is compared with a sound signature recorded earlier to determine changes in the sound signature indicative of tire wear or an abnormal tire shape.

6. The tire-wear detection system of claim 1 wherein a first moisture content of the tire is measured at a third point in time, a second moisture content of the tire at a fourth point in time is measured, and a signal to the telematics system is generated if the difference exceeds a threshold moisture content difference value.

7. A tire-wear detection system for a vehicle having a telematics system and a tire comprising:
    a radio frequency (RF) wave generator for generating a radio frequency (RF) wave; and
    a radio frequency (RF) wave receiver for measuring an amplitude of the RF wave when the tire is in an initial condition and then periodically over time, wherein the tire wear detection system determines a potential defect in the tire based on comparing an amplitude at a first period in time to an amplitude measured at a second period of time, later than the first period of time, and if the difference exceeds a threshold amplitude difference value.

8. The tire-wear detection system of claim 7 wherein an increase in the amplitude of the RF wave indicates tire wear.

9. The tire-wear detection system of claim 8 wherein a decrease in the amplitude of the RF wave indicates tire layer separation.

10. The tire-wear detection system of claim 7 wherein the tire wear detection system determines an alignment issue based comparing tire wear of at least two tires of the vehicle.

11. The tire-wear detection system of claim 7 further comprising a microphone mounted proximate the tire, wherein the microphone records a sound signature of the tire, the microphone generates a signal representative of the sound signature, the microphone transmits the sound signature signal to the controller, the sound signature of the tire is recorded over time, and a most recent sound signature signal is compared with a sound signature recorded earlier to determine changes in the sound signature indicative of tire wear or an abnormal tire shape.

12. The tire-wear detection system of claim 7 wherein a first moisture content of the tire is measured at a third point in time, a second moisture content of the tire is measured at a fourth point in time, and a signal to the telematics system is generated if the difference exceeds a threshold moisture content difference value.

13. A method for detecting tire wear in a vehicle having tires and an onboard telematics system comprising:
    measuring, by an ammeter connected to a wire loop extending about a circumference of a tire, an electrical current value in the wire loop;
    generating a signal of a potential tire defect when a difference in a first current value measured at a first point in time and a second current value measured at a second point in time exceeds a threshold current difference value; and,
    transmitting the signal of the potential tire defect to the telematics system.

14. The method of claim 13 further comprising the steps of:
    measuring a number of tire rotations over a period of time;
    measuring a distance traveled over the period of time;
    calculating a first ratio of the distance traveled per tire rotation at a third period of time;
    calculating a second ratio of the distance traveled per tire rotation at a fourth period of time;
    calculating a difference between the first ratio and the second ratio;
    comparing the difference with a threshold ratio difference value; and
    transmitting a signal to the telematics system of tire wear when the difference exceeds the second threshold value.

15. The method of claim 13 further comprising the steps of:
    measuring a first radio frequency attenuation value through the tire at a third point in time;
    measuring a second radio frequency attenuation value through the tire at a fourth point in time later than the third point in time;
    calculating a difference between the first radio frequency attenuation value and the second radio frequency attenuation value;
    comparing the difference with a threshold radio frequency attenuation difference value; and
    transmitting a signal to the telematics system of irregular tire shape when the difference exceeds the threshold radio frequency attenuation difference value.

16. The method of claim 13 further comprising the steps of:
    measuring a first sound signature of the tire at a third point in time;
    measuring a second sound signature of the tire at a fourth point in time later than the third point in time;
    calculating a difference between the first sound signature and the second sound signature;
    comparing the difference with a threshold sound signature difference value; and
    transmitting a signal to the telematics system of a potential tire defect when the difference exceeds the threshold sound signature difference value.

17. The method of claim 13 further comprising the steps of:
    measuring a first moisture content of the tire at a third point in time;
    measuring a second moisture content of the tire at a fourth point in time;
    calculating a difference between the first moisture content and the second moisture content;
    comparing the difference with a threshold moisture content difference value; and
    transmitting a signal to the telematics system when the difference exceeds the threshold moisture content difference value.

18. The method of claim 13, further comprising:
    calculating the tire wear of each of two tires of the vehicle; and
    detecting, based on a comparison of the tire wear of the two tires, alignment issues.

* * * * *